United States Patent
Logan et al.

[11] 3,833,435
[45] Sept. 3, 1974

[54] DIELECTRIC OPTICAL WAVEGUIDES AND TECHNIQUE FOR FABRICATING SAME

[75] Inventors: Ralph Andre Logan, Morristown; Bertram Schwartz, Westfield; Joseph Charles Tracy, Jr., Bernardsville; William Wiegmann, Middlesex, all of N.J.

[73] Assignee: Bell Telephone Laboratories Incorporated, Murray Hill, N.J.

[22] Filed: Sept. 25, 1972

[21] Appl. No.: 291,937

[52] U.S. Cl............... 156/11, 29/576, 148/175, 156/17, 204/32, 331/94.5, 350/96 WG
[51] Int. Cl.............................................. H01l 7/50
[58] Field of Search........ 156/8, 11, 13, 17; 29/576, 29/589; 350/96 WG; 148/171, 175; 204/32, 35; 331/94.5; 317/234, 235

[56] References Cited
UNITED STATES PATENTS
3,523,223    8/1970    Luxem et al..................... 317/234

OTHER PUBLICATIONS
IBM Technical Disclosure Bulletin, Vol. 15, No. 1, June 1972, Method for Making Hemispheres by Potemski et al., pp. 147 & 148.

*Primary Examiner*—William A. Powell
*Attorney, Agent, or Firm*—M. J. Urbano

[57] ABSTRACT

A method of fabricating dielectric optical waveguides comprises the steps of: (1) fabricating a single or double heterostructure from the GaAs-AlGaAs system preferably by liquid phase epitaxy or molecular beam epitaxy; (2) forming a native oxide layer on the top surface of the heterostructure by anodization in $H_2O_2$; (3) removing a portion of the oxide layer to form a mask and hence to define the waveguide shape in the direction of light propagation; and (4) forming a mesa-like structure with optically flat side walls by etching at a slow rate in $Br_2$-$CH_3OH$. After step (4) two alternative techniques leading to structurally different waveguides may be followed. In one technique, an AlGaAs layer is epitaxially grown over the mesa to form a two dimensional waveguide. In the other technique, the edges of the active region of an AlGaAs double heterostructure are differentially etched in a neutral solution of $H_2O_2$. The latter step is particularly useful in the fabrication of active devices because the resulting structure is self-masking, thereby facilitating the formation of electrical contacts.

12 Claims, 8 Drawing Figures

FORM DOUBLE HETEROSTRUCTURE AND NATIVE OXIDE LAYER

DEFINE STRIPE BY PHOTOLITHOGRAPHY

POLISHING ETCH

GROW EPI AlGaAs LAYER

DIFFERENTIALLY ETCH GaAs

EVAPORATE CONTACTS

DIELECTRIC OPTICAL WAVEGUIDES AND TECHNIQUE FOR FABRICATING SAME

BACKGROUND OF THE INVENTION

This invention relates to dielectric optical waveguides and more particularly to the fabrication of such wave guides from the GaAs-AlGaAs system.

It has been proposed by S. E. Miller in the *Bell System Technical Journal*, Vol. 48, pages 2,059 et seq. (1969) that optical signals can be processed using a form of integrated circuitry similar to that used in microwave technology. Such circuitry would find important applications in high-capacity optical communications systems and optical computers. The circuits could contain narrow dielectric light (wave) guides which would serve as the basis for both active components (e.g., modulators, detectors and light sources) as well as passive components (e.g., couplers, filters and interconnections).

A typical dielectric optical waveguide comprises an elongated core of dielectric material surrounded by a medium having a lower index of refraction, e.g., a core of GaAs surrounded by AlGaAs. When one considers a cross-section of such a waveguide perpendicular to its optical axis (i.e., the z-direction), it is apparent that such a structure confines light in two dimensions (i.e., the $x$ and $y$ directions). Hereinafter this type of structure will be referred to as a two-dimensional waveguide. The degree of confinement is a function of the refractive index difference between the core and its surrounding medium, and the optical loss per unit length is a function of the quality of the interface therebetween. With respect to the interfaces, J. E. Goell et al. in *Applied Physics Letters*, Vol. 21, pages 72 et seq (1972) have pointed out that the smoothness of the walls of the waveguide is an important consideration in the fabrication of a dielectric waveguide. Excessive scattering loss results when the waveguide has rough walls. Thus, for example, in a waveguide having the shape of a rectangular parallelepiped, one of the more perplexing problems that has plagued the prior art is the inability to control adequately the smoothness of the guide walls to a tolerance of a fraction of an optical wavelength over a dimension of about five wavelengths (see, D. Marcuse, *Bell System Technical Journal*, Vol. 48, pp. 3,187 et seq. (1969)). In a GaAs dielectric waveguide, for example, a relevant wavelength in the semiconductor is $\lambda = 0.25$ $\mu$m. Consequently, the smoothness dimension of the dielectric waveguide walls should preferably be controlled to a tolerance of less than about $0.1 \lambda$ or 250 angstroms over a dimension of about 1.25 $\mu$m.

The advent of the double heterostructure laser raised hopes that a practical two-dimensional dielectric waveguide might become a reality. The double heterostructure, as described by M. B. Panish et al. in *Scientific American*, Vol. 224, page 32 et seq (1971), typically comprises a 1.0 $\mu$m thick GaAs layer sandwiched between relatively thicker layers of AlGaAs. Heterojunctions formed at the interfaces with the GaAs layer form a dielectric waveguide which guides light in the direction perpendicular to the plane of the layers, i.e., the growth plane in the case of either liquid phase epitaxy (LPE) or molecular beam epitaxy (MBE) fabrication. However, since no heterojunctions are formed perpendicular to the growth plane, light is not guided in the direction parallel to the growth plane, i.e., the dielectric waveguide of Panish et al. is one-dimensional.

Although the work of Panish et al. was greeted by the technical world with considerable enthusiasm, no one has taught a practical way to utilize double heterostructure concepts to produce a two-dimensional dielectric waveguide in which, for example, a substantially rectangular parallelepiped core of GaAs is surrounded on four sides by AlGaAs and in which the dimensions of the guide are controlled to within a few hundred angstroms.

SUMMARY OF THE INVENTION

In accordance with an illustrative embodiment of our invention, a technique for fabricating a two-dimensional dielectric waveguide comprises the steps of: (1) fabricating a single or double heterostructure from the GaAs-AlGaAs system. Preferably the heterostructure is fabricated by a liquid phase epitaxial (LPE) growth technique taught by M. B. Parish et al. in *Metallurgical Transactions*, Vol. 2, pages 795–801 (1971) or by a molecular beam epitaxy (MBE) growth technique taught by J. R. Arthur, Jr. in U.S. Pat. No. 3,615,931 (Case 3) issued on Oct. 26, 1971, and as further taught by A. Y. Cho in copending patent application Ser. No. 127,926 (Case 2) filed on Mar. 25, 1971, (now U.S. Pat. No. 3,751,310, issued on Aug. 7, 1973) and assigned to the assignee hereof. Of the two, MBE may be preferred since more precise control of layer thicknesses is attainable; (2) forming a native oxide layer on the top major surface of the heterostructure by anodization in $H_2O_2$ in accordance with the teachings of B. Schwartz in copending application Ser. No. 292,127 (Case 13) filed on even date herewith and assigned to the assignee hereof. The use of a native oxide is preferred over a conventional oxide such as $SiO_2$. The latter is relatively more difficult to fabricate, generally requiring an evaporation scheme, and, in addition, presents some difficulties in adhering to the GaAs-AlGaAs layers. The native oxide, of course, being a part of the top layer itself, presents no problems of adhesion and moreover is relatively simple to fabricate; (3) removing a portion of the native oxide layer by standard photolithographic techniques in order to define from the remaining oxide layer a mask having a predetermined shape, e.g., a stripe; and (4) forming a mesa-like structure by bringing the heterostructure into contact with a $Br_2$-$CH_3OH$ solution which slowly etches away the portions of the GaAs-AlGaAs layers not protected by the native oxide mask. Importantly, the bromine concentraction is carefully controlled so that the etching rate is relatively slow, e.g., 1–3 $\mu$m/hr. In this range not only are the side walls of the mesa (i.e., of the waveguide) made optically flat over an extended length, but also the cross-sectional shape of the mesa remains substantially constant along the extended length (i.e., the etching is uniform along the length).

The terms mesa and mesa-like structure will be used interchangeably hereinafter to mean a waveguide in which the cross section, taken perpendicular to the direction of light propagation therein, has the approximate shape of a truncated triangle. This definition may be in conflict with the conventional definition of a mesa which has the general shape of a truncated cone.

At this point in our inventive fabrication technique either of two alternative approaches may be followed. One approach includes the steps of: (5) epitaxially growing by MBE or LPE an AlGaAs layer over the mesa structure, thereby forming another pair of heterojunctions at the interfaces with the edges of GaAs layer. Thus, the GaAs layer (i.e., the core) is surrounded on all four sides with the smaller index of refraction material, AlGaAs; and (6) if the structure is to be utilized as an active device (e.g., a junction laser), making electrical contacts to the device utilizing an appropriate masking technique. It should be noted, however, that inasmuch as an active device includes an active region such as a p-n junction, the AlGaAs layer grown in step (5) must be at least semi-insulating in order that the active region not be short-circuited.

In order to avoid the necessity of growing such a semi-insulating layer and to eliminate the mask alignment steps which naturally arise in the making of electrical contacts to such a device, we propose an alternative approach which results in a self-masking dielectric waveguide. More specifically, assume that initially a double heterostructure, comprising an $Al_yGa_{1-y}As$ middle layer sandwiched between outer layers of $Al_xGa_{1-x}As$ and $Al_zGa_{1-z}As$, $y < x$ and $z$, was fabricated in step (1). Then, after step (4) above the following steps are performed: (5') bringing the double heterostructure mesa into contact with a neutral solution of $H_2O_2$, preferably agitating the solution while in contact with the heterostructure, as taught by J. C. Dyment, R. A. Logan, and B. Schwartz in copending application Ser. No. 291,941 (Case 6-19-15) filed concurrently herewith. This solution etches differentially the middle layer at a faster rate than the adjacent $Al_xGa_{1-x}As$ and $Al_zGa_{1-z}As$ layers of the heterostructure as long as $y < x$ and $z$. As a result, the middle layer is etched inwardly from its edges leaving a central core of $Al_yGa_{1-y}As$ bounded on its edges by air and on its top and bottom by outer AlGaAs layers which overhang the middle layer. The resultant pedestal-like structure has the significant advantage that it is self-masking. That is to say, where the middle layer is an active region of an active device, the formation of electrical contacts simply requires the additional step of: (6') depositing a suitable conductor (e.g. metal) over the entire top surface of the mesa. Because the outer AlGaAs layers overhang the middle layer and form an air gap therebetween, the deposited conductor will be bifurcated at the air gap and will not short circuit the active region. Photolithographic techniques, with attendant mask alignment problems, are not required.

BRIEF DESCRIPTION OF THE DRAWING

The invention, together with its various features and advantages, can be easily understood from the following more detailed description taken in conjunction with the accompanying drawing, in which.

DETAILED DESCRIPTION

Figure 5A:
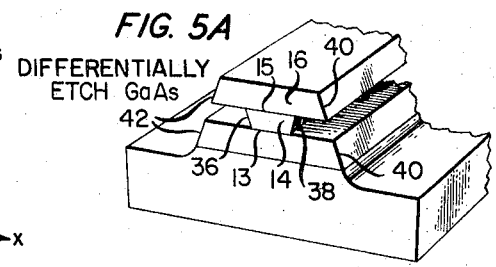
FIG. 5A shows an illustrative dielectric waveguide in accordance with still another embodiment of our invention in which the mesa of FIG. 3 has been exposed to an etchant which differentially etches the AlGaAs layers.
Figure 5B:
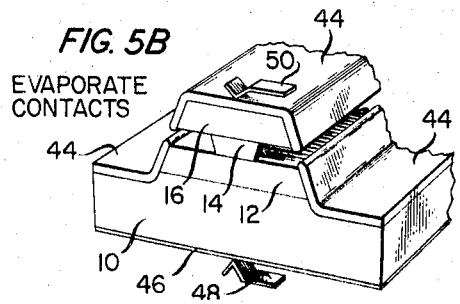
FIG. 5B demonstrates the self-masking feature of the structure of FIG. 4B.
Figure 6:
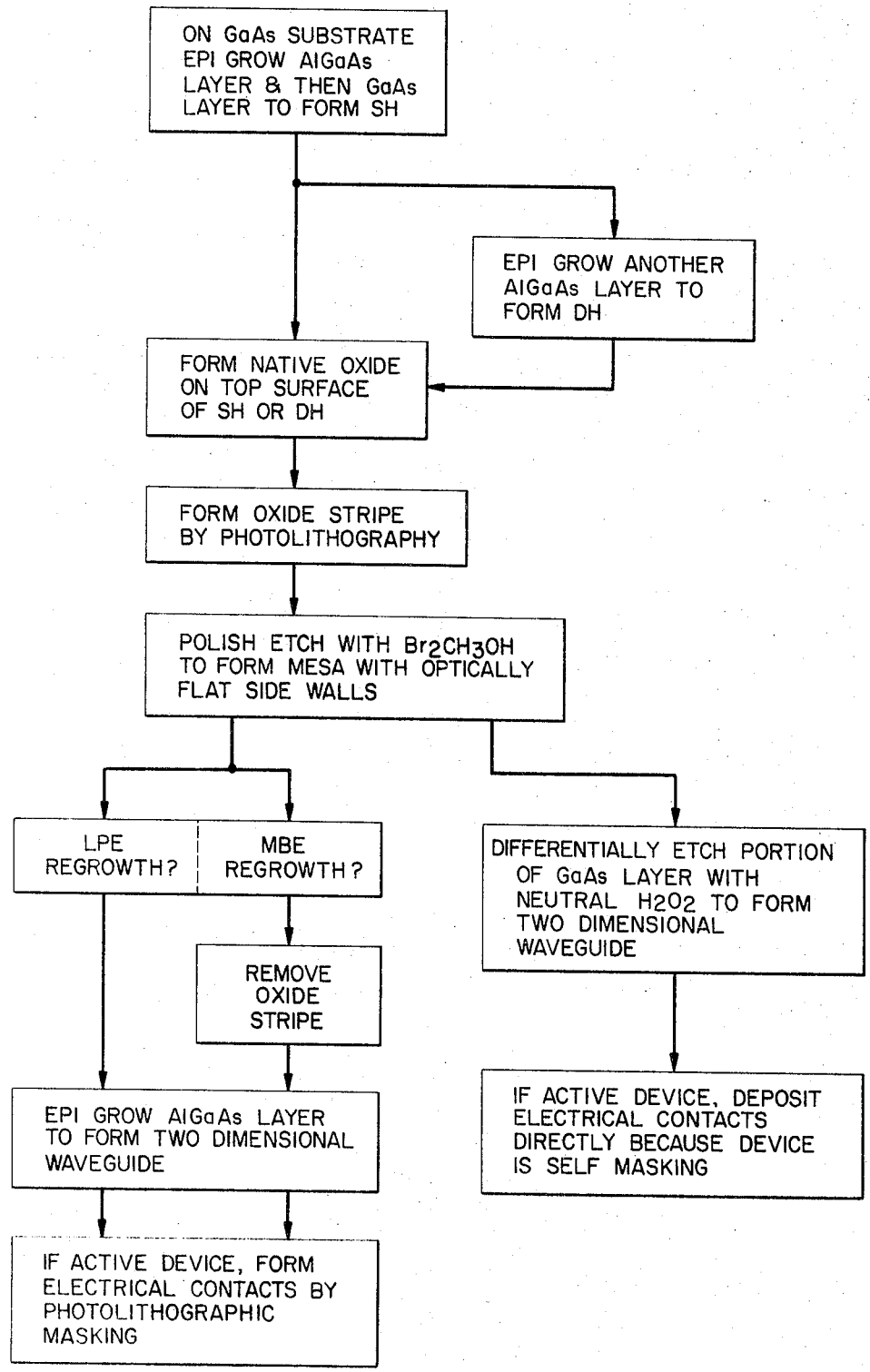
FIG. 6 is a flow charrt of the principal fabrication steps in accordance with an illustrative embodiment of our invention.

An illustrative embodiment of our invention will now be described with concurrent reference being made to the flow chart of FIG. 6 and to the schematic structures of FIGS. 1 – 5. The latter figures depict the sequential structural changes in illustrative dielectric waveguides after each principal step in our inventive technique is completed. Of course, for simplicity and clarity of explanation FIGS. 1 – 5 are not necessarily drawn to scale.

Figure 1:
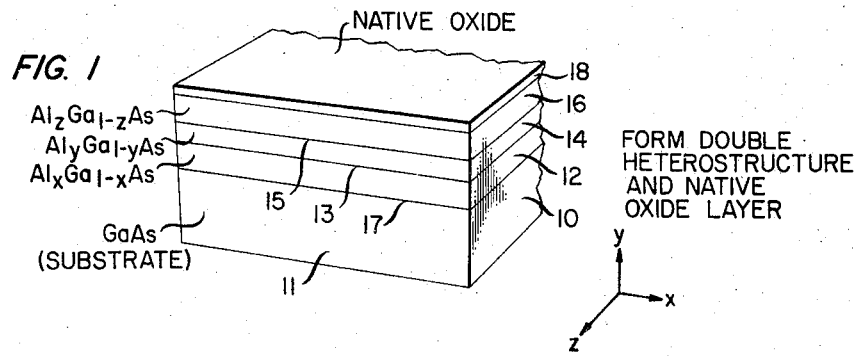
FIGS. 1 to 3 show the structural changes following various steps in the fabrication of a double heterostructure mesa in accordance with an illustrative embodiment of our invention.

Turning now to FIG. 1, there is shown a multilayered device comprising a GaAs substrate 10 on which have been epitaxially grown the following layers in the sequential order recited: an $Al_xGa_{1-x}As$ layer 12, $x > 0$; an $Al_yGa_{1-y}As$ layer 14, $0 \leq y < x$; and an $Al_zGa_{1-z}As$ layer 16, $z > y$. The interfaces 13 and 15 between layer 14 and layers 12 and 16, form a pair of heterojunctions which will ultimately serve to confine light in the y-direction, i.e., perpendicular to the growth plane. For a symmetric waveguide structure, of course, the atomic percent of Al in layers 12 and 16 should be the same, i.e., $x = z$. Typically the substrate 10 is n-type GaAs with the end face 11 being a (011) cleavage plane and the top surface 17 being a (100) growth plane.

The double heterostructure of FIG. 1. may ultimately form either an active device or a passive device depending upon the carrier concentrations in the various layers and upon the operational environment in which the device is utilized. Thus, for example, for use as junction laser, layers 12, 14, and 16 typically have n-p-p type conductivity, respectively, thereby forming a p-n heterojunction at interface 13 and a p-p heterojunction at interface 15. Under forward bias, and when mounted on a suitable heat sink and in an optical resonator, this type of laser has been successfully operated on a continuous wave basis at room temperature as discussed by M B. Panish et al. in *Scientific American*, supra. Alternatively, the device may function as a phase or amplitude modulator if layer 14 is made to be a compensated, high resistivity layer as taught by F. K. Reinhart in copending application Ser. No. 193,286 (Case 2) filed on Oct. 28, 1971 (now U.S. Pat. No. 3,748,597, issued on July 24, 1973) and assigned to the assignee hereof. As a passive device, on the other hand, this structure may be utilized simply as a transmission line, i.e., a dielectric waveguide, in which the light is guided in layer 14. In all of the foregoing active and passive devices, however, it is desirable to confine the light not only in the y-direction perpendicular to the growth plane but also in the x-direction parallel to the growth plane, assuming that light is propagating in the z-direction.

To this end the subsequent steps in our inventive technique will be described in terms of a stripe geometry structure, although it is to be understood that more complicated geometric shapes of the dielectric waveguide are readily achieved by means of suitable masks in a photolithographic technique. In order to define such a stripe, the next step in our technique is to form a native oxide layer 18 (FIG. 1) on the AlGaAs top layer 16. The term "native oxide" as used herein means an oxide formed from the constituent elements of the underlying layer rather than from a foreign element not included in the molecular compound of the underlying layer. Thus, for example, we do not prefer to utilize a $SiO_2$ layer which is relatively more complicated to fabricate and which tends not to adhere to the AlGaAs top layer 16. With these problems in mind, we have found that a native oxide formed by the anodization scheme of B. Schwartz (Case 13, supra) is preferred. Briefly, in this technique the double heterostructure of FIG. 1 is placed in an electrolyte bath illustratively comprising $H_2O_2$ (30 percent) and $H_2O$ (70 percent). The double heterostructure is made the anode whereas a noble metal such as platinum is made the cathode. The electrolyte bath is typically buffered with phosphoric acid to a pH of 2.0 and a source of about 100 volts DC is connected between the anode and cathode. After about 10 minutes a native oxide layer is grown having a thickness of about 1,850 angstroms. Next, the double heterostructure of FIG. 1 is removed from the bath and air dried by heating, for example, to 100° C. for 1 hour and then to 250° C. for 2 hours. In general, a suitable pH range is about 1 to 6 and a suitable voltage range is about 5 to 175 volts.

Figure 2:
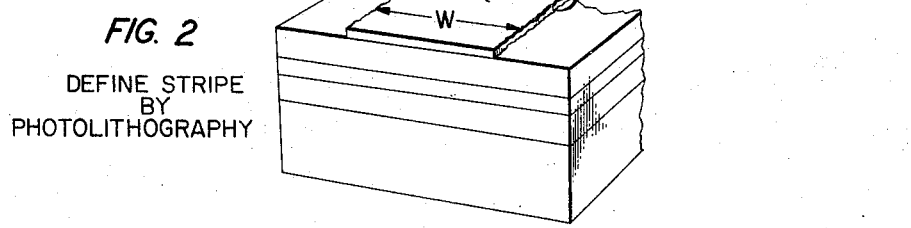

After drying is completed, portions of the native oxide layer 18 are removed by standard photolithographic techniques in order to define illustratively an elongated oxide stripe 20 as shown in FIG. 2. As described hereinafter, this stripe will be utilized to form a mesa structure and ultimately a two-dimensional waveguide. It should be noted that the oxide stripe 20 is highly irregular from the standpoint of optical smoothness. More specifically, we have found that the oxide stripe 20 typically has along its edges 22 and 24 peak-to-peak variations of $1 \mu m$ in its width dimension ($w$) which occur with 1 $\mu m$ periodicity in the z-direction along the stripe. One would not expect such an irregular stripe to produce the smoothness required of a good quality dielectric optical waveguide; e.g., in GaAs a smoothness of about 0.1 λ or 250 angstroms over a length of about 1.25 $\mu m$. Moreover, as discussed by E. G. Spencer et al. in J. Vacuum Sc. & Tech., Vol. 8, pp. S52-70, at S63 (1971), one would normally not expect conventional etching technology to be able to reduce these irregularities to the required optical smoothness.

We have discovered, however, that a $Br_2$-$CH_3OH$ etchant, of sufficient dilution to produce a relatively slow etching rate, etches away the GaAs-AlGaAs layers not protected by oxide stripe 20 and importantly does two things: (1) it produces optically flat mesa side walls and (2) it etches uniformly so that the cross-sectional shape of the mesa is substantially constant over its length. More specifically, a Br-$CH_3OH$ solution containing approximately 0.5 to 1.0 parts bromine per 1,000 by volume produces an etching rate of about 1–3 $\mu m$ per hour. At this rate the etchant acts as a polish so that along the top edges 26 and 28 (FIG. 3) of the mesa the amplitude of the irregularities is reduced by a factor of at least 10 and their periodicity is increased by a factor of at least 100. Thus, this relatively slow $Br_2$-$CH_3OH$ etchant effectively produces mesa side walls having a high degree of optical smoothness as required for dielectric optical waveguides.

Figure 3:
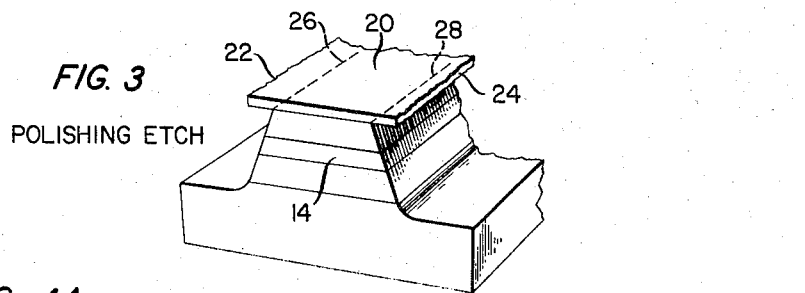

Incidentally, the etchant undercuts the oxide stripe 20 as shown in FIG. 3 leaving a portion of stripe 20 which overhangs mesa edges 26 and 28. The overhang, however, has been found to produce no difficulties in the subsequent fabrication steps.

In addition, the etchant has the desirable property that it does not attack, i.e., dissolve, the native oxide stripe 20 — an essential requirement if the top surface of the mesa, and hence its shape, is to be preserved during the etching step.

When the growth plane of the epitaxial layers is (100) and the cleavage plane is (011), we found, in addition, that the slanted side walls of the mesa are (111) planes. The obliqueness of the side walls is an important feature if molecular beam epitaxy is to utilized to subsequently grow an AlGaAs layer over the mesa as will be described more fully hereinafter.

At this point in our inventive technique two alternative approaches may be followed depending upon the ultimate structure desired. In one type of structure shown in FIG. 4A, an $Al_qGa_{1-q}As$ layer 30, $q > y$, is epitaxially grown over the mesa structure of FIG. 3 by molecular beam epitaxy, liquid phase epitaxy, or any other suitable technique. Layer 30 forms another pair of heterojunctions at the interfaces 32 and 34 with layer 14 and thereby serves to confine light in the x-direction. Thus, the four heterojunctions at interfaces 13, 15, 32 and 34 bound the light guide core (layer 14) and confine light in both the $x$ and $y$ directions. A two-dimensional waveguide is thereby formed.

It should also be noted that layer 30 serves to passivate the sides of the waveguide structure by preventing contaminants from entering from either the top or side surfaces.

Where the growth of layer 30 is by means of LPE, it may be desirable to leave oxide stripe 20 (FIG. 3) on the top layer 16 during the growth process so that the liquid solution utilized to grow layer 30 does not wet and dissolve the top surface of layer 16 and thereby deteriorate the optical quality of the dielectric waveguide. In this case layer 30 would not grow on the oxide mask but only on the side walls of the mesa. On the other hand, where layer 30 is to be grown by MBE, then the oxide stripe 20 may first be removed. Most mineral acids and common bases will serve this purpose, e.g., HCl in a solution of one part concentrated HCl and one part $H_2O$. Utilizing this technique, particularly good quality, smooth layers 30 have been grown by MBE on sidewalls and the top of the mesa.

Moreover, whereas some etchants tend to produce vertical side walls on the mesa, we have found that $Br_2$-$CH_3OH$ in the above-specified concentration preferentially etches the {111} planes provided that the epitaxial growth plane is (100). The {111} planes form an angle of about 53° with the horizontal, i,e., the x-direction. When utilizing MBE to grow layer 30, the presence of such slanted side walls is particularly advantageous to avoid shadowing of the side walls from the molecular beam which might occur if the side walls were more nearly vertical. Shadowing, of course, could result in incomplete coverage of the side walls and hence a partial or complete failure of the structure to guide light in the x-direction.

Figure 4A:
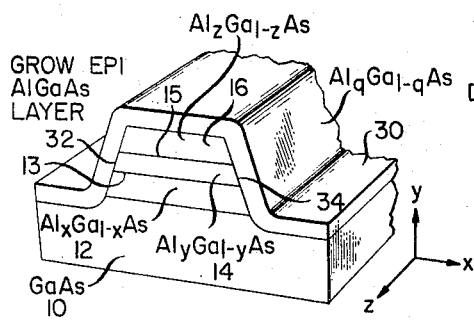
FIG. 4A shows an illustrative embodiment of a dielectric waveguide formed by growing an AlGaAs epitaxial layer over the mesa of FIG. 3.

The shadowing problem may be further alleviated by an optional step in which, after removing the native oxide, the edges of layer 16 can be rounded off by etching in bromine methanol. A bromine concentration as previously described will initially etch the edges at a faster rate than the more central portions of the layer.

Where the structure of FIG. 4A is to be utilized as an active device, such as a junction laser or phase modulator, it is necessary that the last grown AlGaAs layer 30 be at least semi-insulating in order that the active region (e.g., the p-n junction) of the device not be short-circuited. For an active device, therefore, the next step in the procedure would be to form electrical contacts to the substrate 10 and to the AlGaAs layer 16, illustratively by evaporation. Of course, before contact to layer 16 can be effected an appropriate photolithographic masking and etching technique would be utilized to expose a predetermined portion of the top surface of layer 16. The latter technique could readily utilize the native oxide masking and bromine methanol etching procedures previously described.

Figure 4B:
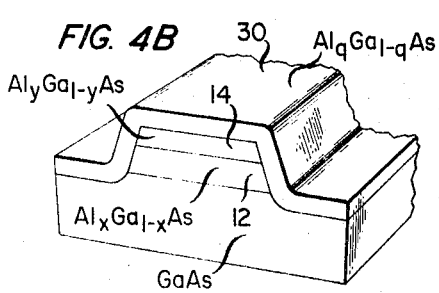
FIG. 4B shows an illustrative embodiment of another dielectric waveguide which results from the initial fabrication of a single heterostructure instead of a double heterostructure.

From the foregoing description of the sequential steps in the fabrication of a double heterostructure dielectric waveguide (FIG. 4A), it is at once apparent to one skilled in the art that initially the procedure could have begun with the fabrication of a single heterostructure only, in which case the AlGaAs layer 16 of FIG. 1 would not be fabricated. In all other respects, however, the fabrication procedure would follow the steps previously described and the resultant structure would appear as shown in FIG. 4B. In both FIGS. 4A and 4B, $Al_yGa_{1-y}As$ layer 14 forms an elongated dielectric core surrounded on four sides by AlGaAs layers 30 and 12 (FIG. 4B) and layers 30, 12 and 16 (FIG. 4A). The amount of aluminum in the core is less than that of the surrounding layers so that the core has a higher index of refraction. Thus, light propagating in the z-direction in layer 14 is confined thereto by two pairs of heterojunctions which form a two-dimensional dielectric waveguide.

Where the structures of FIG. 4A and 4B are active devices, difficulties may arise in making the last grown AlGaAs layer 30 semi-insulating and/or in aligning photolithographic masks for making electrical contacts. Under such circumstances, a preferred approach in accordance with another illustrative embodiment of our invention is to begin with the mesa structure of FIG. 3 and to differentially etch away the outer portions of layer 14 to produce the pedestal-like structure shown in FIG. 5A. To insure this result, the amount of aluminum in layer 14 must be less than that in layers 12 and 16 — precisely the situation which obtains in a double heterostructure, i.e., $y < x$ and $z$. The need for less aluminum in layer 14 arises from the fact that a substantially neutral solution of $H_2O_2$ acts as a differential etchant, i.e., it etches $Al_yGa_{1-y}As$ at a faster rate as $y$ decreases. This phenomenon is taught in Dyment-Logan-Schwartz, Case 6–19–15, supra. In FIG. 2 of that application etching rate versus percent aluminum in AlGaAs is plotted for a solution of 30 percent $H_2O_2$ in water buffered with $NH_4OH$ to a pH of 7.05. For example, if $y = 0$ in $Al_yGa_{1-y}As$, (i.e., GaAs) then the etching rate is about 6 $\mu$m/hr, whereas if $y = 0.1$ the rate rapidly drops off to about 0.6 $\mu$m/hr. Thus, in a DH having a GaAs middle layer sandwiched between $Al_{0.1}Ga_{0.9}As$ layers, the middle layer will etch at a rate about 10 times faster than the AlGaAs layers.

During the etching process oxide platelets are formed on the etched surfaces. It is preferred, therefore, that the solution and/or structure be agitated during the etching step. In one useful technique which we have utilized, the structures were waxed with apiezon-w-wax to a two-inch diameter quartz disk which was placed in the bottom of a beaker containing the etching bath. The beaker was maintained about 30° off vertical and was rotated at about 60 rpm during the etching step.

As a result, we have achieved highly uniform, smooth etching of the layer 14. In addition, we have found that the etchant dissolves the native oxide. The combined differential etching of AlGaAs and dissolution of the native oxide produces the structure of FIG. 5A. In FIG. 5A, where a (100) growth plane was used, the interior edges 36 and 38 of layer 14 are respectively parallel to the preferential {111} etching planes 40 and 42 which form the side walls of the mesa.

Although an $H_2O_2$ solution with a pH of 7.05 is preferred, we have determined that a useful pH range is approximately 6 to 8. Below a pH of about 6 the solution acts as an oxidant rather than an etchant. In contrast, above a pH of about 8 etching proceeds so rapidly that undesirable pitting of the etched surfaces may occur.

In an illustrative example, we fabricated on a GaAs substrate a double heterostructure having 1 $\mu$m thick GaAs middle layer sandwiched between relatively thicker layers (e.g. 3–6$\mu$m) of $Al_{0.3}Ga_{0.7}As$. The DH was initially about 8 mm wide, 12 mm long and 0.4 mm thick (including the substrate). After etching with bromine methanol, a mesa was formed having a 12 $\mu$m width along its top surfce. After differentially etching in an agitated solution of $H_2O_2$ (pH of 7.05), the width of the middle layer was reduced from about 12 $\mu$m to about 1 $\mu$m, whereas the width of the contiguous AlGaAs layers was practically unaffected.

The waveguide structure of FIG. 5A has several useful features. First, in a DH junction laser the narrowed middle layer 14 would serve not only to enhance current confinement but also transverse mode control. Secondly, and importantly, the structure is self-masking. That is to say, even though the layer 14 might form the active region of an active device (e.g., include a p-n junction) no photolithographic masking is required when making electrical contact to layer 16. More specifically, as shown in FIG. 5B, contact to layer 16 is simply made by evaporating or otherwise forming a metallic contact 44 over the entire top surface of the mesa structure. Because layers 12 and 16 overhang (i.e., extend laterally beyond) layer 14, and form an air gap therebetween, the deposited contact 44 is bifurcated at the air gap and will not short-circuit the active region 14. Illustratively, contact 44 is a gold-chromium alloy evaporated onto a p-AlGaAs layer 16 and contact 46 is a tin-platinum alloy evaporated onto n-GaAs substrate 10. Connection to an external circuit is illustratively made by means of bonded wires 48 and 50.

It is to be understood that the above-described arrangements are merely illustrative of the many possible specific embodiments which can be devised to represent application of the principles of our invention. Numerous and varied other arrangements can be devised in accordance with these principles by those skilled in the art without departing from the spirit and scope of the invention. In particular, the double heterostructure of FIG. 1 may take on various structural configurations such as, for example, a double-double heterostructure of the type described by I. Hayashi in U.S. Pat. No. 3,691,476 (Case 5) issued on Sept. 12, 1972 and assigned to the assignee hereof, or a modified double heterostructure (which includes a p-n homojunction between a pair of common-conductivity-type heterojunctions) as described by L. A. D'Asaro et al. in copending application Ser. No. 203,709 (Case 11–12) filed on Dec. 1, 1971 (now abandoned) and assigned to the assignee hereof.

What is claimed is:

1. A method of fabricating a dielectric waveguide comprising the steps of:
   a. epitaxially growing a GaAs-AlGaAs heterostructure in which light is to be guided;
   b. forming a native oxide layer on a major surface of said heterostructure,
   c. removing from said major surface selected portions of said oxide layer thereby forming from the remaining portions of said oxide layer a mask having a predetermined shape; and
   d. forming a mesa from said heterostructure by bringing same into contact with a bromine methanol solution containing approximately 0.05 to 0.1 percent bromine by volume, thereby etching away at a relatively slow rate those portions of said heterostructure not covered by said mask, said solution being effective to form optically flat surfaces on opposite side walls of said mesa.

2. The method of claim 1 wherein said native oxide forming step ($b$) comprises the steps of bringing said major surface into contact with an electrolyte bath containing a solution of $H_2O_2$ in water, making said heterostructure an anode and a noble metal a cathode therein, applying a voltage between said anode and cathode for a time period sufficient to form on said major surface a native oxide layer of the desired thickness, removing said heterostructure from said bath and subsequently drying said heterostructure.

3. The method of claim 2 wherein said electrolyte bath comprises a solution of about 30 percent $H_2O_2$ and 70 percent $H_2O$ with a pH in the range of about 1 to 6.

4. The method of claim 1 wherein said heterostructure is epitaxially grown on a (100) surface of a GaAs substrate having its (011) cleavage plane perpendicular to the direction of light to be guided therein, and wherein said etching produces optically flat surfaces preferentially along {111} crystallographic planes.

5. The method of claim 1 wherein said heterostructure is a double heterostructure comprising at least one $Al_yGa_{1-y}As$ middle layer disposed between and contiguous with a pair of AlGaAs outer layers comprising $Al_xGa_{1-x}As$ and $Al_zGa_{1-z}As$, $y < x$ and $z$, and including the additional step of: bringing said double heterostructure into contact with a solution of $H_2O_2$ having a pH in the range of about 6 to 8, said latter solution being effective to differentially etch a portion of said middle layer and to form a pedestal-like mesa in which the width of said middle layer is smaller than the corresponding width of said outer layers, so that said outer layers overhang said middle layer and form air gaps therebetween.

6. The method of claim 5 wherein the pH of said solution is approximately 7.05.

7. The method of claim 5 wherein $y = 0$ and said middle layer comprises GaAs.

8. The method of claim 5 wherein said solution of $H_2O_2$ is agitated while in contact with said heterostructure.

9. A method of fabricating a dielectric waveguide comprising the steps of: (a) epitaxially growing on a GaAs substrate a double heterostructure comprising at least one $Al_yGa_{1-y}As$ middle layer formed between and contiguous with a pair of AlGaAs outer layers comprising $Al_xGa_{1-x}As$ and $Al_zGa_{1-z}As$, $y < x$ and $z$, said middle layer being adapted for the propagation of light therethrough; (b) forming a native oxide layer on the topmost AlGaAs layer of said double heterostructure by submersing said double heterostructure in an electrolyte bath comprising a solution of $H_2O_2$ buffered with an acid, making said double heterostructure the anode and a noble metal the cathode across which a voltage is applied for a time period sufficient to grow a native oxide layer of the desired thickness, removing said double heterostructure from said bath and subsequently drying said heterostructure by heating same; (c) removing selected portions of said oxide layer thereby forming from the remaining portions thereof a mask having a predetermined shape; (d) forming a mesa from said double heterostructure by bringing same into contact with a bromine methanol solution containing approximately 0.05 to 0.1 percent bromine by volume, thereby etching away at a relatively slow rate those portions of said heterostructure not covered by said mask, said etching being effective to form optically flat surfaces on opposite side walls of said mesa; and (e) bringing said mesa into contact with a solution of $H_2O_2$ having pH in the range of about 6 to 8 and simultaneously agitating said solution, said latter agitated solution being effective to differentially etch said middle layer at a faster rate than said outer layers, thereby to form a pedestal-like mesa structure in which the width of said middle layer is less than the corresponding width of said outer layers, so that said outer layers overhang said middle layer and form air gaps therebetween.

10. The method of claim 9 wherein $y = 0$ and said middle layer comprises GaAs.

11. The method of claim 9 wherein said $H_2O_2$ solution of step ($e$) comprises a solution of about 30 percent $H_2O_2$ in water which is buffered with a base to a pH of approximately 7.05.

12. The method of claim 11 wherein said base comprises ammonium hydroxide.

* * * * *

UNITED STATES PATENT OFFICE
CERTIFICATE OF CORRECTION

Patent No. 3,833,435              Dated September 3, 1974

Inventor(s) Ralph A. Logan, Bertram Schwartz, Joseph C. Tracy, Jr and William Wiegmann It is certified that error appears in the above-identified patent and that said Letters Patent are hereby corrected as shown below:

Column 2, line 20, change "Parish" to --Panish--.

Column 6, line 13, change "(111)" to --{111}--.

Signed and sealed this 3rd day of December 1974.

(SEAL)
Attest:

McCOY M. GIBSON JR.
Attesting Officer

C. MARSHALL DANN
Commissioner of Patents